United States Patent
Fulks et al.

(10) Patent No.: US 6,264,290 B1
(45) Date of Patent: Jul. 24, 2001

(54) SINGLE-OPERATION VALVE ASSEMBLY FOR BRAKING SYSTEMS AND THE LIKE

(75) Inventors: Gary Chris Fulks, Dayton; Daniel Norbert Borgemenke, Springboro; Randall L. Derr, Bellbrook; James Randolph Bond, Centerville, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/364,393

(22) Filed: Jul. 30, 1999

(51) Int. Cl.[7] ........................................... B60T 17/04
(52) U.S. Cl. ........................... 303/28; 137/467; 137/511
(58) Field of Search .......................... 137/247.15, 467, 137/511, 519, 533.19, 537; 303/116.2, 41, 28, 29, 119.2

(56) References Cited

U.S. PATENT DOCUMENTS

| | | | |
|---|---|---|---|
| 3,096,825 | * | 7/1963 | Clark . |
| 3,224,455 | * | 12/1965 | Alfieri . |
| 3,766,940 | * | 10/1973 | Mason ................................. 137/460 |
| 3,776,258 | * | 12/1973 | Dockins .............................. 137/269 |
| 3,800,979 | * | 4/1974 | Piffath ................................ 220/89 A |
| 4,365,643 | * | 12/1982 | Masclet ................................ 137/70 |
| 4,833,946 | * | 5/1989 | Lemieux ................................ 74/868 |
| 5,086,613 | * | 2/1992 | Fox ..................................... 56/10.9 |
| 5,275,196 | * | 1/1994 | Mitchell .............................. 137/224 |
| 5,538,336 | * | 7/1996 | Reuter ................................ 303/119.2 |
| 5,927,832 | * | 7/1999 | Fulks .................................. 303/167 |
| 5,944,068 | * | 8/1999 | Hool .................................... 141/65 |

* cited by examiner

Primary Examiner—J. J. Swann
Assistant Examiner—David Divine
(74) Attorney, Agent, or Firm—Robert M. Sigler

(57) ABSTRACT

A single-operation valve assembly useful in such braking system applications, as well as others, includes a flow passage and a valve member located within the flow passage at a first position in which the valve member prevents fluid flow from an upstream side of the valve member to a downstream side of the valve member. The valve member and flow passage are configured for movement of the valve member from the first position along the flow passage to a second position along the flow passage when a pressure difference between the upstream side of the valve member and the downstream side of the valve member exceeds a threshold level. The valve member and the flow passage are also configured for free flow of fluid along the flow passage in either direction when the valve member moves to the second position. Thus, in a braking system circuit the subject valve assembly does not interfere with fluid flow in the circuit after the valve member has been blown to the second position.

6 Claims, 3 Drawing Sheets

SINGLE-OPERATION VALVE ASSEMBLY FOR BRAKING SYSTEMS AND THE LIKE

TECHNICAL FIELD

This invention relates generally to valve assemblies used in braking circuits, and more particularly, to a single operation valve assembly for an anti-lock braking system circuit.

BACKGROUND OF THE INVENTION

A conventional anti-lock brake system ("ABS") monitors the wheels of a vehicle and institutes corrective action when the wheels begin to slip or lock up during braking. When the ABS recognizes that one or more of the wheels are slipping during braking, the system reduces the brake fluid pressure applied to the wheel brake of the slipping wheel. Once the wheel begins turning again, the fluid pressure applied to the wheel brake is gradually reapplied until the wheels begin slipping again. Fluid pressure applied to a given wheel brake can be reduced by providing a fluid pressure relief path to an accumulator. Fluid can then be pumped from the accumulator back into the main ABS braking circuit.

It is important in any braking system circuit to assure that air or other gases are not present in the circuit, as the compressible nature of air inhibits proper braking performance. Accordingly, in conventional braking systems a vacuum is drawn on the braking system circuit to remove all gases before brake fluid is introduced into the braking circuit. In some manufacturing environments it is desirable to prefill portions of the braking circuit with brake fluid prior to connecting such pre-filled portions with remaining portions of the overall braking system circuit. When the final braking circuit is constructed having a pre-filled portion and a non-prefilled portion, it is necessary to draw a vacuum on the non-prefilled portion in order to removes gas from the entire braking system circuit. It is also necessary to include one or more valves which prevent the inflow of brake fluid from the prefilled portion when the vacuum is drawn on the non-prefilled portion. Traditional check valves or coffin valves have been used for such purposes in the past. However, such traditional valves present certain problems including remaining in the braking system circuit continuously and having at least some affect in the braking system circuit even after the valve is no longer needed.

SUMMARY OF THE INVENTION

The present invention is a single-operation valve assembly useful in such braking system applications as well as others, enabling prefill of portions of braking system circuits and subsequent drawing of vacuum of other braking system portions. The single-operation valve acts as a fluid "fuse" in that once the flow blocking valve is "blown" the valve thereafter permits fluid flow in either direction. In one embodiment the single-operation valve assembly includes a flow passage and a valve member located within the flow passage at a first position in which the valve member prevents fluid flow from an upstream side of the valve member to a downstream side of the valve member. The valve member and flow passage are configured for movement of the valve member from the first position along the flow passage to a second position along the flow passage when a pressure difference between the upstream side of the valve member and the downstream side of the valve member exceeds a threshold level. The valve member and the flow passage are also configured for free flow of fluid along the flow passage in either direction when the valve member moves to the second position. Thus, in a braking system circuit the subject valve assembly does not interfere with fluid flow in the circuit after the valve member has been blown to the second position.

In another aspect of the invention a method of temporarily blocking flow of a brake fluid along a fluid path of an ABS braking circuit in at least a first direction along the fluid path to enable prefill of a portion of the braking circuit involves providing a flow passage which defines at least a portion of the fluid path and providing a valve member within the flow passage at a first position in which the valve member prevents fluid flow at least from an upstream side of the valve member to a downstream side of the valve member as long a pressure difference between the upstream side of the valve member and the downstream side of the valve member is below a threshold level. A fluid pressure at the upstream side of the valve member is increased until the pressure differential reaches the threshold level and the valve member is moved from the first position to a second position along the flow passage when the pressure reaches the threshold level. The valve member and the flow passage are configured for free flow of fluid along the flow passage in either direction when the valve member moves to the second position.

DESCRIPTION OF THE PREFERRED EMBODIMENT

Figure 1:
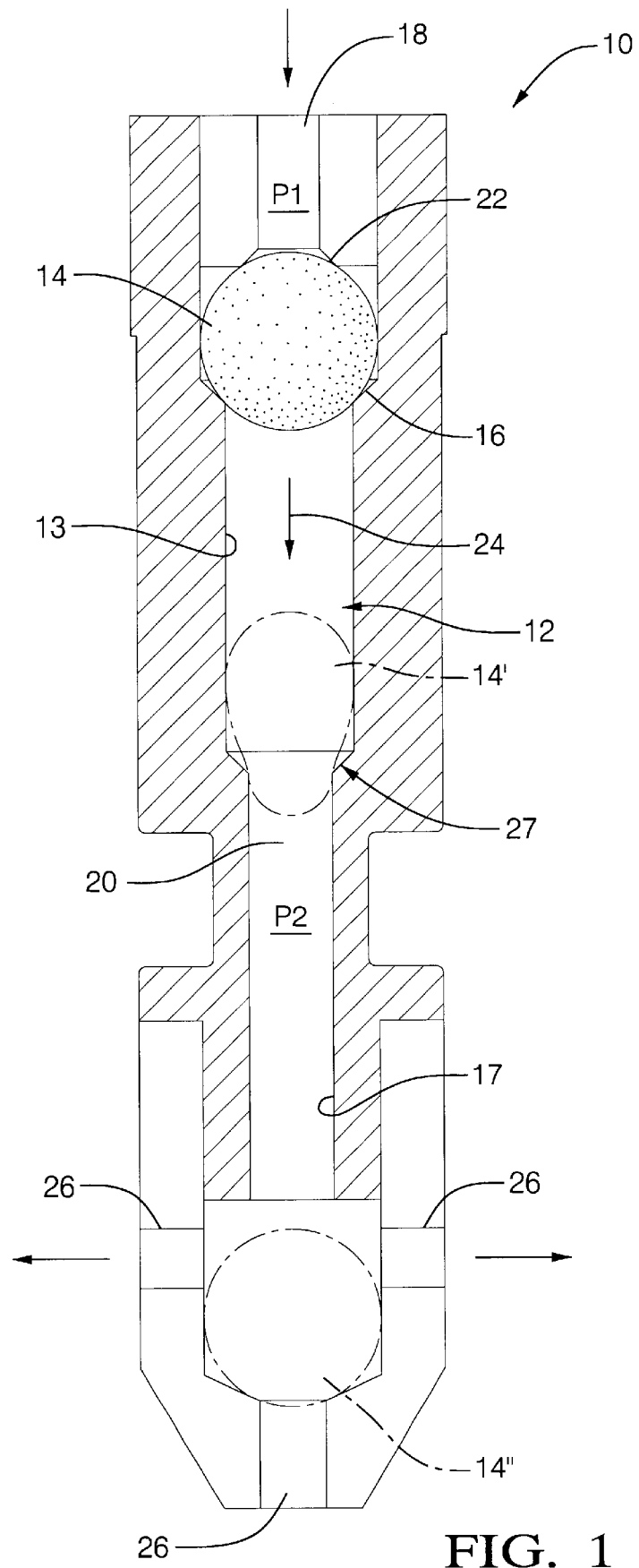
FIG. 1 is a cross-sectional view of one embodiment of a valve assembly in accordance with the present invention.

Reference is made to drawing FIG. 1 in which one embodiment of a valve assembly in accordance with the present invention is shown. The valve assembly includes a flow passage 12 along the length thereof. A valve member 14 is located within the flow passage 12 at a first position in which the valve member contacts a seating surface 16 to prevent fluid flow from an upstream side 18 of the valve member 14 to a downstream side of the valve member 14. The valve member 14 is sized and configured to abut against the seating surface 16 in a sealing manner. A seating surface 22 may also be provided for making sealing contact with the valve member 14 at the upstream side of the valve member 14 in order to also prevent fluid flow from the downstream side to the upstream side 18.

The illustrated valve member 14 is a ball type member which is preferably formed of compressible material such as rubber. When a difference between the pressure P1 at the upstream side of valve member 14 and the pressure P2 at the downstream side of valve member 14 exceeds a threshold level, the ball is compressed and travels downstream as indicated by arrow 24. The valve assembly could be formed with a passage 12 of uniform size such that the aforementioned compression and movement of the valve member 14 results in its relocation to a second position along the passage 12 as shown in dashed lines at 14". Multiple ports 26 are provided at the second position 14" to insure that fluid flow along the passage 12 is permitted in either direction around the valve member once the valve member has moved to the second position 14", regardless of the strength of flow. Although the valve member 14 is shown in a non-compressed first position in the illustrated embodiment, it is understood that the valve member 14 could be pushed into a smaller portion of the flow passage 12 in a pre-compressed manner to establish the flow blocking first position. In this regard, in the illustrated embodiment the flow passage 12 includes a first section 13 and a second section 17, the diameter of section 13 being greater than the diameter of section 17. A seating surface 27 is provided intermediate the two sections and provides an intermediate seating location for the valve member as indicated at 14'. Seating surface 27 aids in permitting expansion of a fluid at the upstream side of the valve without moving the valve member to the non-blocking position 14". Such fluid expansion may occur where the valve assembly 10 is shipped incorporated into a component such as part of a braking system circuit including braking fluid which may expand when subjected to heat. Where the ball moves to and stops at the intermediate position 14', the intermediate position 14' becomes the flow blocking position.

Figure 2:
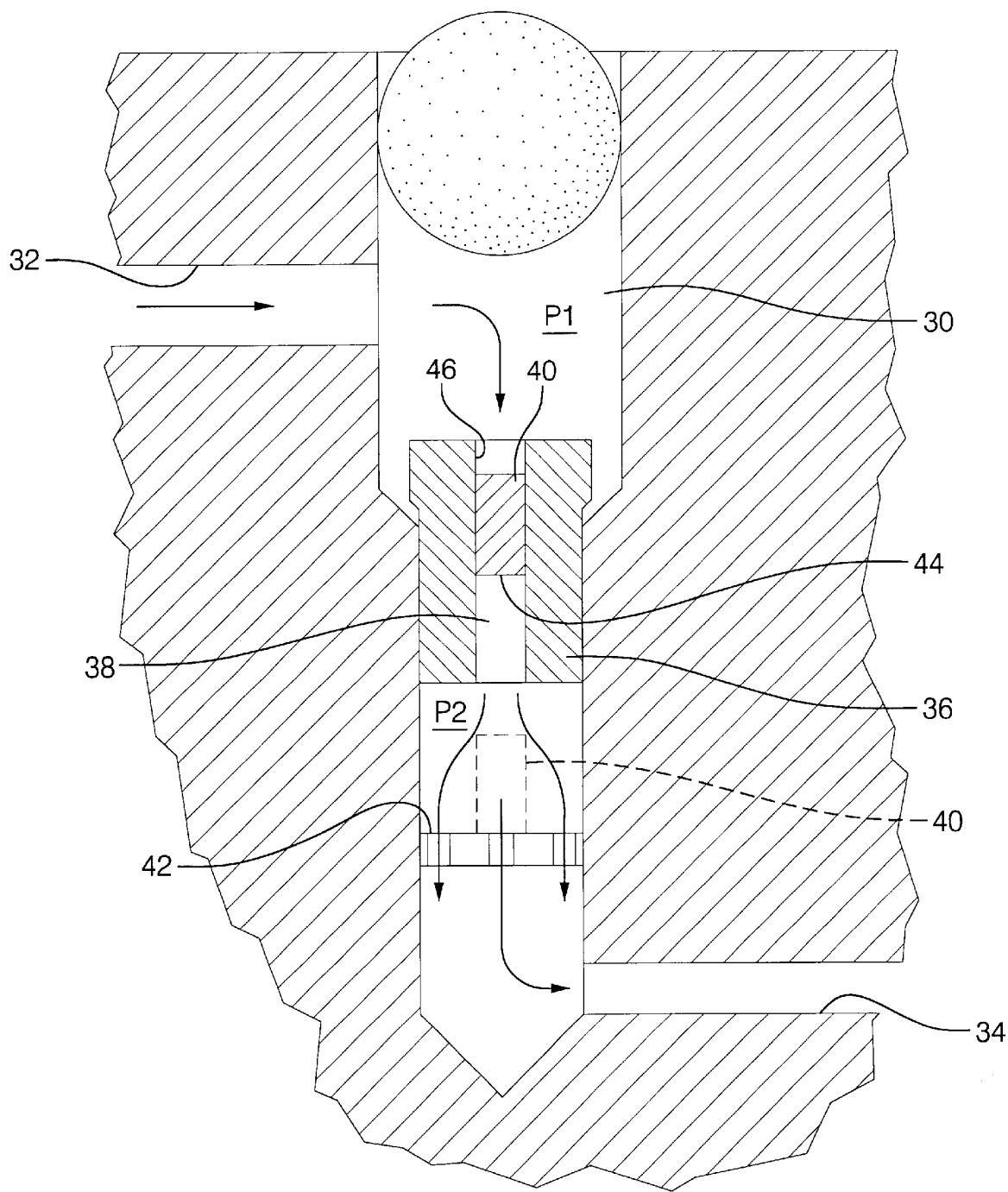
FIG. 2 is a cross-sectional view of another embodiment of a valve assembly in accordance with the present invention.

An alternative embodiment of a single operation valve assembly in accordance with the invention is illustrated in FIG. 2 in which a flow passage 30 is provided with an upstream side 32 and a downstream side 34. An insert 36 is provided along the flow passage and includes a through bore 38 which completes the flow path of and forms part of the flow passage 30. An elongated plug 40 is shown at a first position along the flow passage where the plug 40 is wedged within the through bore 38 of insert 36 for blocking fluid flow in either direction along the flow passage 30. When a difference between the pressure P1 at the upstream side of plug 40 and a pressure P2 at the downsteam side of plug 40 exceeds a threshold level, the plug 40 is "blown" out of the through bore 38 until it contacts a catch member 42 positioned across the flow passage 30. The catch member prevents further movement of the plug 40 along the passage 30 and is configured to permit fluid flow thereabout. The catch member 42 and the plug 40 are arranged in a non sealing manner when the plug reaches the second position shown in dashed lines at 40'. The plug 40 is preferably formed of a polymeric material such as plastic. The plug 40 may include a first end 44 which is tapered or rounded to facilitate insertion within the through bore 38, but it is recognized that such a taper or rounding of the first end 44 is not necessary for the present invention. Similarly, an upstream side 46 of through bore 38 could be slightly enlarged in order to facilitate entry of the plug 40.

As shown at the second position indicated at 40', the flow passage 30 is large enough in size to permit fluid flow around the plug.

Both illustrated embodiments of the valve assembly in the present invention are "single-operation" in that they are configured to initially perform a flow blocking function in at least one direction. However, once the valve member is blown from its blocking first position to a non-blocking second position, the valve member no longer inhibits fluid flow in either direction. The pressure at which either embodiment 'fuses' to the flow permitting state can be varied according to the difference in size between the flow passage and the valve member, as well as by varying the compressibility of the valve member, particularly in the case of the ball-type embodiment.

Figure 3:
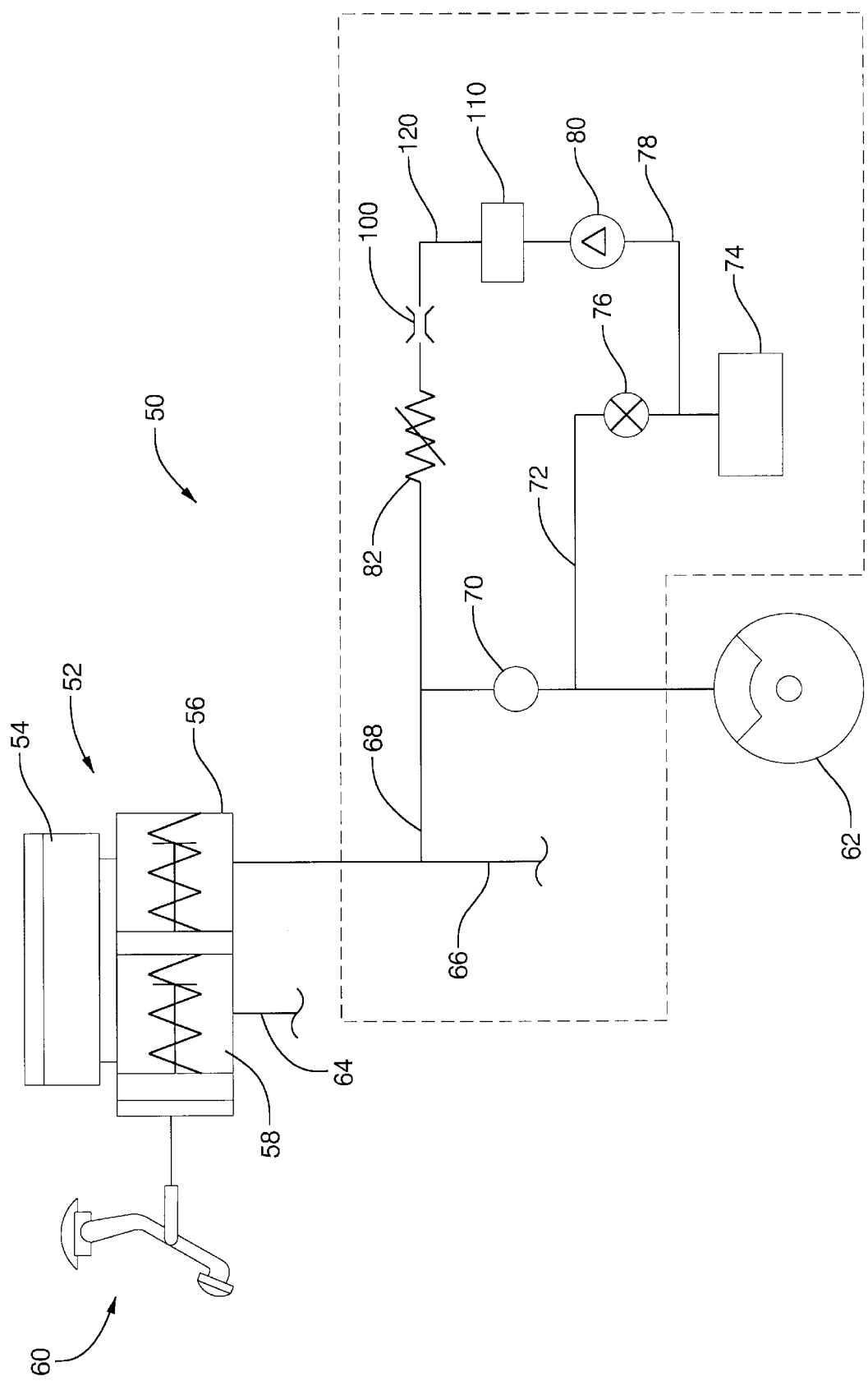
FIG. 3 is a partial schematic diagram of an anti-lock braking system including the valve assembly of the invention.

A particularly useful application of the valve assembly of the present invention is depicted with reference to FIG. 3 showing an anti-lock brake system circuit including an ABS modulator 50 and a master cylinder 52 with an associated brake fluid reservoir 54. The master cylinder 52 includes two fluid chambers 56 and 58 in which the pressure of fluid is controlled by movement of a brake member 60 linked to the chambers 56 and 58 in a suitable manner as is known in the art. Only one wheel brake 62 is illustrated, although it is understood that truncated fluid path 64 would typically be connected to diagonally opposed front and rear wheel brakes and truncated fluid path 66 would typically be connected to the remaining wheel brake. A first fluid path 68 extends from chamber 56 of master cylinder 52 to wheel brake 62. A normally-open controllable valve 70 is positioned along the first fluid path 68 between the chamber 56 and the wheel brake 62. A pressure release fluid path 72 extends from between the normally-open controllable valve 70 and the wheel brake 62 to a brake fluid accumulator 74. A normally-closed controllable valve 76 is positioned along the pressure release fluid path 72. A fluid return path 78 extends from the fluid accumulator 74 to the first fluid path 68 for returning brake fluid to the first fluid path 68. A controllable pump 80 is positioned along the fluid return path 78 for pumping fluid from the accumulator 74 back to the first fluid path 68. The single operation valve assembly of the present invention is positioned along the fluid return path 78 between the attenuator 100 and the first fluid path as shown. Valves 70 and 76 may be any suitable valve commonly used in the art such as solenoid type valves.

During vehicle assembly it is necessary to evacuate the air contained within the brake hydraulic circuit. This evacuation is followed by a pressurized injection of brake fluid. Both evacuation and fill may be achieved through the reservoir cap 54. Certain portions of the brake circuit contained in the ABS modulator 50 are not easily accessible. Accumulator 74 and noise filter volume 110 both require significant time and attention to be successfully filled. Pump 80, fluid path 78 and accumulator 74 are relatively easy to fill prior to vehicle assembly. The noise suppression circuit comprising volume 110, fluid path 120 and attenuator 100 however are not. Valve assembly 82 allows the noise suppression circuit to be filled prior to vehicle assembly.

At vehicle assembly the complete brake circuit may be evacuated and filled through the master cylinder reservoir cap in the normal manner. The first time the ABS module is connected to a power source the pump 80 will run as part of a self-test sequence. The pressure in fluid path 120 will rapidly increase to a working level exceeding the 'fuse' pressure limit of the valve assembly 82. The valve assembly will subsequently transition from a blocked to a free flowing or 'fused' condition. Significantly, unlike known valve assemblies this invention has no further impact on the operation of the ABS system. Other known valve assemblies, for example check valves, continue to limit flow and increase pump load.

Accordingly, the valve assembly of the present invention is useful in providing a method of temporarily blocking flow of a brake fluid along a fluid path in at least a first direction along the fluid path to enable pre-fill of a portion of the braking circuit. The method includes the steps of providing a flow passage which defines at least a portion of the fluid path. A valve member is provided within the flow passage at a first fluid blocking position which prevents fluid flow at least from an upstream side of the valve member to a downstream side of the valve member as long as a pressure differential between the upstream side of the valve member and the downstream side of the valve member is below a threshold level. The fluid pressure at the upstream side of the valve member is then increased until the pressure differential reaches the threshold level. The valve member is then moved from the first position to a second position along the flow passage when the pressure differential reaches the threshold level. As noted above, the valve member and the flow passage are configured for the free flow fluid along the flow passage in either direction when the valve member moves to the second position.

While the forms of the apparatus herein described constitute performed embodiment to the invention, it is to be understood that the invention is not limited to these precise forms of apparatus, and any changes may be made therein without departing from the scope of the invention.

What is claimed is:

1. A method of temporarily blocking flow of a brake fluid along a fluid path of an ABS braking circuit in at least a first direction along the fluid path, comprising the steps of:

providing a flow passage which defines at least a portion of the fluid path;

providing a valve member within said flow passage at a first position in which the valve member prevents fluid flow at least from an upstream side of said valve member to a downstream side of said valve member as long a pressure difference between said upstream side of said valve member and said downstream side of said valve member is below a threshold level;

increasing a fluid pressure at said upstream side of said valve member until said pressure difference reaches said threshold level;

responsively moving said valve member from said first position to a second position along said flow passage when said pressure difference reaches said threshold level, wherein said valve member and said flow passage are configured for free flow of fluid along said flow passage in either direction when said valve member moves to said second position, wherein a prefill portion of the braking circuit is located at said upstream side of said valve member, said method comprising the further step of filling the prefill portion of the braking circuit with a braking fluid to result in a pre-established pressure difference between said upstream side of said valve member and said downstream side of said valve member, said pre-established pressure difference being below the threshold level.

2. The method of claim 1 wherein said pre-established pressure difference holds said valve member in said first position.

3. A brake system circuit comprising:

a master cylinder;

a first fluid path extending from a chamber of said master cylinder to a wheel brake;

a normally-open controllable valve positioned along the first fluid path between said chamber and said wheel brake;

a pressure release fluid path extending from between said normally-open controllable valve and said wheel brake to a fluid accumulator;

a normally-closed controllable valve positioned along said pressure release fluid path;

a fluid return path extending from the fluid accumulator to the first fluid path;

a controllable pump positioned along said fluid return path for pumping fluid from said accumulator back to said first fluid path;

a single-operation valve assembly positioned along said fluid return path between said pump and said master cylinder, including a flow passage and a valve member, the valve member located within said flow passage at a first position in which fluid flow toward said pump is blocked, wherein said valve member and flow passage are configured for movement of said valve member from said first position along said flow passage to a second position along said flow passage when a pressure difference between the first fluid path side of the valve member and the pump side of the valve member exceeds a threshold level, said valve member and said flow passage configured for free flow of fluid along said flow passage in either direction when said valve member moves to said second position.

4. The brake system circuit of claim 3 wherein said valve member comprises a compressible ball-shaped member having a non-compressed size which is greater than a diameter of at least a portion of said flow passage, said ball-shaped member compressing to facilitate movement past said portion of said flow passage from said first position to said second position.

5. The brake system circuit of claim 3 wherein said valve member comprises an elongated plug, wherein at said first position said elongated plug is wedged within a first portion of said flow passage for blocking flow, and wherein at said second position said elongated plug is located along a second portion of said flow passage large enough in size to permit fluid flow around said elongated plug.

6. A method of temporarily blocking flow of a brake fluid along a fluid path of an ABS braking circuit in at least a first direction along the fluid path, comprising the steps of:

providing a flow passage which defines at least a portion of the fluid path;

providing a valve member within said flow passage at a first position in which the valve member prevents fluid flow at least from a prefill portion of the braking circuit at an upstream side of said valve member to a downstream side of said valve member as long a pressure difference between said upstream side of said valve member and said downstream side of said valve member is below a threshold level, said threshold level being less than a working level encountered in operation of the ABS braking circuit;

configuring said valve member and said flow passage for automatic movement of said valve member from said first position to a second position along said flow passage when said pressure difference reaches said threshold level and subsequent permanent retention of said valve member in said second position and for free flow of fluid along said flow passage in either direction when said valve member is in said second position; and filling the prefill portion of the braking circuit with a braking fluid to result in a pre-established pressure difference between said upstream side of said valve member and said downstream side of said valve member, said pre-established pressure difference being below the threshold level, whereby said valve member will be automatically moved to said second position to unblock said flow passage with operation of said ABS braking circuit.

\* \* \* \* \*